UNITED STATES PATENT OFFICE.

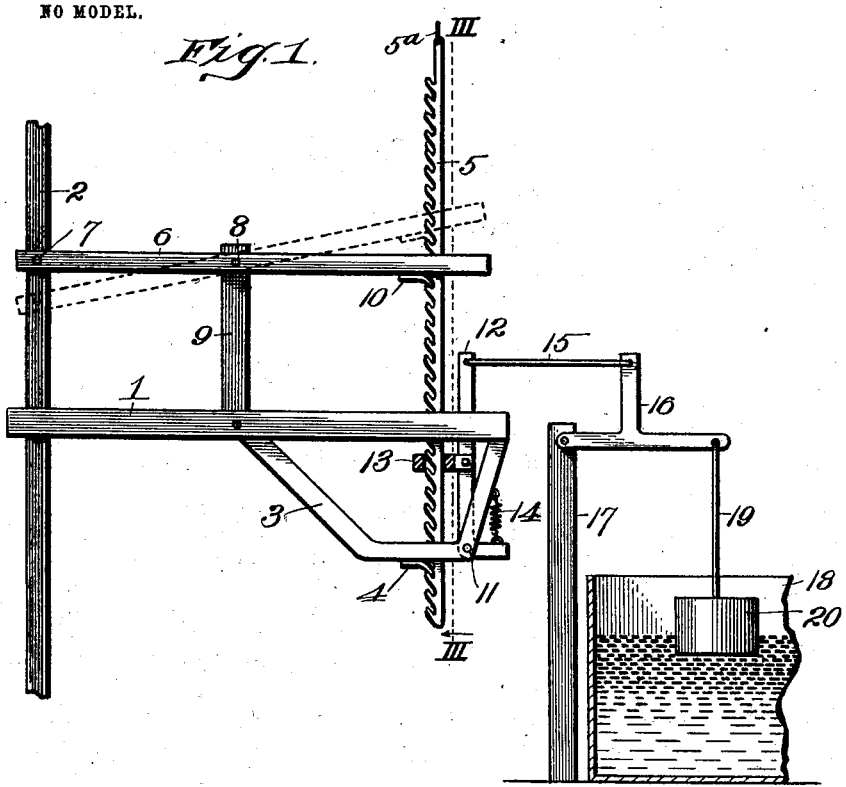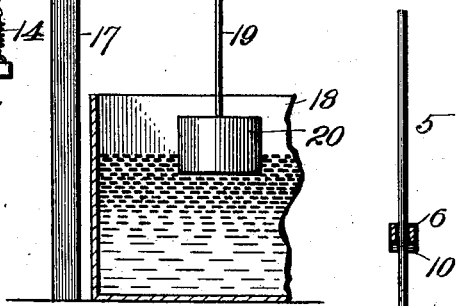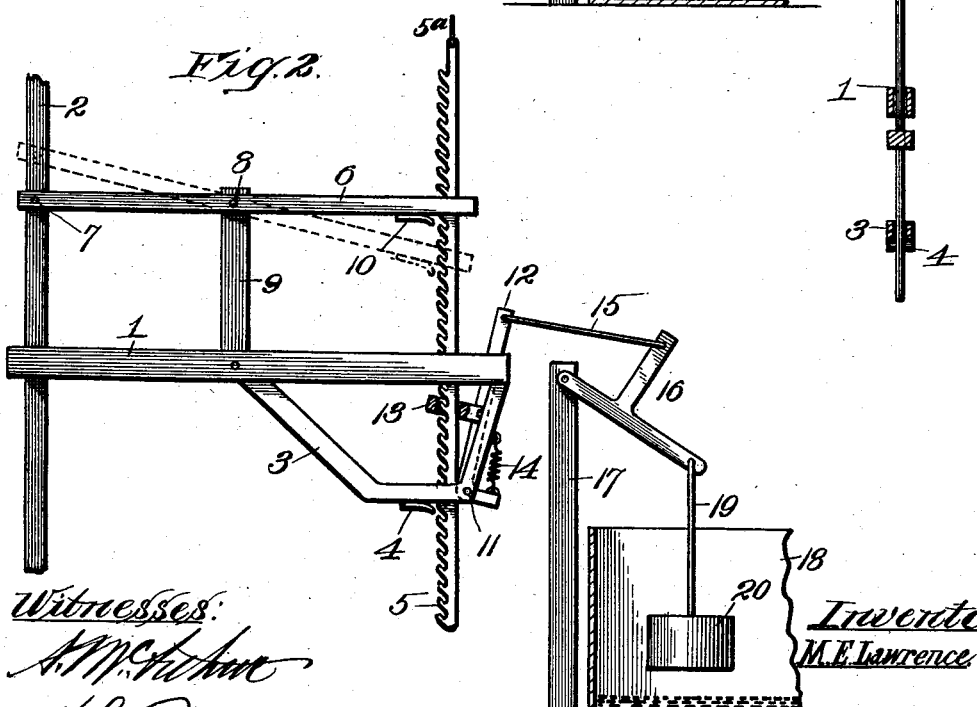

MACK E. LAWRENCE, OF MORROWVILLE, KANSAS.

WINDMILL-REGULATOR.

SPECIFICATION forming part of Letters Patent No. 720,161, dated February 10, 1903.

Application filed October 17, 1902. Serial No. 127,658. (No model.)

*To all whom it may concern:*

Be it known that I, MACK E. LAWRENCE, a citizen of the United States, residing at Morrowville, in the county of Washington and State of Kansas, have invented certain new and useful Improvements in Windmill-Regulators, of which the following is a specification.

My invention relates to windmill-regulators of that class which permits the windmill and pump to operate when the water-level of the tank is low and arrests the movement of such parts when the water-level is restored to the proper point.

My object is to produce a regulator which is positive and reliable in action, which is simple, strong, durable, and cheap of construction, and which can be easily and quickly connected to any windmill and tank.

To this end the invention consists in certain novel and peculiar features of construction and combinations of parts, as hereinafter described and claimed, and in order that it may be fully understood reference is to be had to the accompanying drawings, in which—

Figure 1 represents a view, partly in side elevation and partly in section, of the tank, pump-pole, and regulator mechanism, the parts being shown as in the position they occupy as the water-level of the tank is restored and the wind-wheel (not shown) is about to be thrown out of the wind. Fig. 2 is a similar view showing the water too low in the tank and the float in such position that it throws the regulator out of gear, so as to permit the wind-wheel to be thrown back into the wind to operate the pump, and thereby restore the water-level. Fig. 3 is a vertical section taken on the line III III of Fig. 1.

Referring to the drawings in detail, 1 designates a horizontal bar of suitable material and adapted to be secured in the tower of a windmill in any suitable or preferred manner. This bar is slotted or bifurcated, as shown in Fig. 3, to accommodate the movement therethrough of certain parts, one of said parts being the pump pole or rod 2, adapted to be reciprocated by the wind-wheel in any suitable manner.

3 designates a frame depending rigidly from the bar 1 and like the latter provided with a slot or bifurcation (see Fig. 3) and with a bit or tooth 4 for engagement at times with the vertical rack-bar 5, so as to lock the latter in its depressed position, and thereby hold the wind-wheel, connected to the upper end of said rack-bar by a cable $5^a$ or any equivalent means, out of the wind, and therefore inoperative.

6 designates a rock-lever pivotally connected at one end, as at 7, to the pump-pole and at or near its middle, as at 8, to the upper end of a standard 9, pivoted to bar 1 and adapted to rock toward the pump-pole when pivot 7 is moving downward or upward from the horizontal plane of pivot 8 and adapted to swing from the pump-pole when pivot 7 is moving upward or downward toward the plane of pivot 8. As the pump-pole reciprocates in a vertical plane, the lever thus necessarily not only oscillates, but moves longitudinally, and near its free end is provided with a depending bit or tooth 10, which is adapted under certain conditions to engage and depress the rack-bar, and thereby throw the wind-wheel out of the wind, the free end of said lever being bifurcated or slotted (see Fig. 3) to act as a guide for the rack-bar, which extends therethrough.

Fulcrumed, as at 11, to the lower portion of frame 3 and at the opposite side of the rack-bar from bit or tooth 4 is a bell-crank lever 12, the same being provided with a clip 13, which loosely embraces the rack-bar.

14 designates a retractile spring connecting one end of the bell-crank lever with frame 3, and 15 a link pivotally connecting the opposite arm of said lever with an inverted-T lever 16, mounted on a standard 17, contiguous to the tank 18.

Pivotally depending from lever 16 into the tank is a rod 19, having a float 20 at its lower end, said float being sufficiently heavy to descend as the level of the water in the tank is lowered and overcoming the resistance of spring 14 cause clip 13 to pull the rack-bar out of engagement with the bits or teeth. This action permits the wind-wheel to be thrown to operative position by the wind, and therefore set the pump in operation, the same discharging water into the tank until the required level has been attained. As the water-level rises the float is incidentally elevated, and with the coöperation of spring 14 causes clip 13 to force the rack-bar toward the pump-pole, and therefore into the path of the bit or tooth 10 of rock-lever 6, operated by the pump-pole. The descent of the toothed end of the rock-lever forces the rack-bar downward in an obvious manner, its teeth slipping past bit or tooth 4 and instantly reengaging the latter under the pressure of spring 14 and the float as its descending movement terminates. If the wind-wheel is not thrown entirely out of operation by one operative stroke of lever 6, the bit or tooth of the latter in rising slides successively over the opposing teeth of the rack-bar, the latter swinging aside at its upper end to accommodate this movement. On the next stroke of said lever the rack-bar is again moved downward, these actions being repeated until the wind-wheel is entirely out of the wind and is locked thereat by bit or tooth 4 until the water-level again falls below a predetermined plane, as hereinbefore explained.

From the above description it will be apparent that I have produced a windmill-regulator which embodies the features of advantage enumerated as desirable in the statement of invention and which is obviously susceptible of modification in some particulars without departing from the principle of construction involved.

Having thus described the invention, what I claim as new, and desire to secure by Letters Patent, is—

1. A windmill-regulator, comprising a pump-pole, a rack-bar, a float-operated mechanism for adjusting the rack-bar, a pivoted standard between and substantially parallel with the pump-pole and rack-bar, a rock-lever extending transversely of and fulcrumed upon said standard, and pivoted to the pump-pole near one end and provided at opposite sides of its fulcrum-point and near its opposite end with a bit or tooth to engage and depress the rack-bar when the water in the tank reaches the required level, and a second bit or tooth to lock the rack-bar in the depressed position to which it is adjusted by the first one.

2. A windmill-regulator, comprising the pump-pole, a rack-bar, a rock-lever pivoted at one end to the pump-pole and having longitudinal as well as oscillatory action, and provided near its free and longitudinally-movable end with a bit or tooth to engage and depress the rack-bar under certain conditions, a second bit or tooth to engage and lock the rack-bar against upward movement, a lever having a clip engaging the rack-bar between its bits or teeth, and a float connected to said lever to cause it, when the water falls below a predetermined standard, to free the rack-bar from said bits or teeth, and when it rises to such standard to force the rack-bar into position for engagement by said teeth.

3. A windmill-regulator, comprising the pump-pole, a rack-bar, a rock-lever pivoted at one end to the pump-pole and having longitudinal as well as oscillatory action, and provided near its free and longitudinally-movable end with a bit or tooth to engage and depress the rack-bar under certain conditions, a second bit or tooth to engage and lock the rack-bar against upward movement, a lever having a clip engaging the rack-bar between its bits or teeth, a float connected to said lever to cause it, when the water-level falls below a predetermined standard, to free the rack-bar from said bits or teeth, and when it rises to such standard to force the rack-bar into position for engagement by said teeth, and a spring connecting said clip-carrying lever to a fixed point and coöperating with the float when the latter moves upward.

In testimony whereof I affix my signature in the presence of two witnesses.

MACK E. LAWRENCE.

Witnesses:
J. A. TOTTEN,
C. D. KIFF.